(No Model.)

F. C. AVERY.
BALL BEARING.

No. 556,655. Patented Mar. 17, 1896.

Witnesses,
S. H. Brainard,
Geo. S. Gleason.

Inventor,
F. C. Avery.

UNITED STATES PATENT OFFICE.

FREDERICK C. AVERY, OF CHICAGO, ILLINOIS.

BALL-BEARING.

SPECIFICATION forming part of Letters Patent No. 556,655, dated March 17, 1896.

Application filed July 14, 1894. Serial No. 517,539. (No model.)

*To all whom it may concern:*

Be it known that I, FREDERICK C. AVERY, a citizen of the United States, residing in the city of Chicago, in the county of Cook and State of Illinois, have invented a new and useful Improvement in Ball-Bearings, of which the following is a specification.

The object of my invention is to produce a superior device for protecting a ball-bearing against dust or grit, and a bearing that oil can be applied directly on the balls, also a bearing that will retain the balls when the cone is removed. This will simplify and cheapen the construction without any addition in weight, which is the object I have in view.

Figure 1:
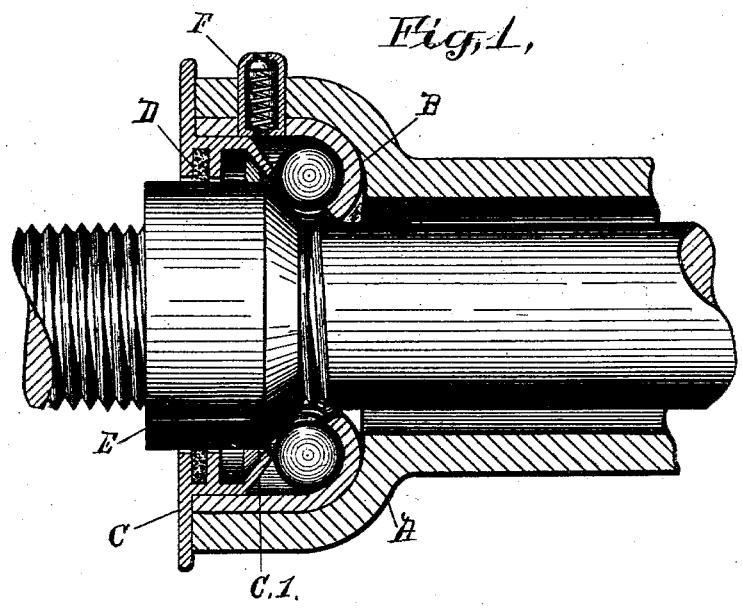
Figure 2:
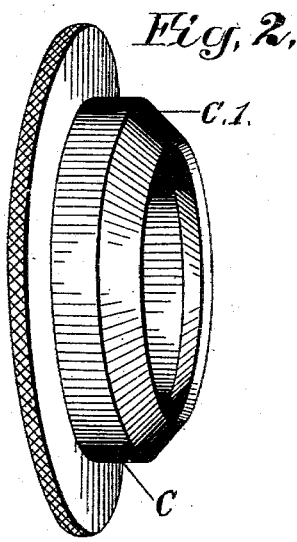

Referring to the accompanying drawings, Figure 1 is a longitudinal section of a ball-bearing, showing my device in place. Fig. 2 is a view of the combined dust-cover and ball-retainer removed from the bearing, which ball-retainer also is arranged to convey oil directly to the balls, as hereinafter shown.

A is the case or outside portion of a ball-bearing; B, the inside shell or ball-holder; C, the dust cover or cap; C', the inwardly-converging bevel-edge extension forming ball-retainer; D, the groove filled with felt or other soft material; E, the cone, and F the tube through which oil is applied to the bearing. A single oil-hole could be used, but I employ a tube, as it also takes the place of a pin in serving to lock the inside shell to the outer portion as well as performing its function as an oil-duct.

It will be noticed that the cone is cut away to a cylindrical form from a point a little above the bearing or contact with the balls all the way to its outer end. This leaves an annular space between the cone E and inside of shell B, which I utilize for a dust cap or cover. The dust-cover C, extending on the inside of the shell B and held by friction or otherwise, has on the extreme end a beveled and inwardly-converging portion C', whose inner edge approaches the inner edge of shell B, so as to leave a space between less than the diameter of the balls, which prevents the balls from falling out of the bearing when the cone is removed. It can also be seen that if oil is applied to the tube F it will run down to and over the bevel portion C' and lodge directly on the balls, even if it were a single drop. The dust-cover C is also provided with a groove on the inside edge, as shown at D, into which felt or other soft material is inserted to protect the bearing from dust. This pad is permanently retained in the dust-cap and is arranged to bear edgewise upon the cylindrical portion of the cone E, where it is cut away in accordance with my invention, so that when the cone is adjusted inwardly it slides telescopically through this pad and does not bear laterally against the pad, as heretofore. This lateral compression of the dust-pad by the inward adjustment of the cone is very objectionable, since it causes such a frictional binding as to interfere with the free running of the wheel when the cone is tightened. In the drawings I have shown a ball-bearing with an inner shell for the purpose of showing the oil-tube as a locking-pin, but otherwise this device can be applied to a ball-bearing having no inner shell.

The novel feature of my invention is to be found in cutting away the usual flange of the cone and making the outer portion of the same cylindrical and of less diameter than the shell or ball-holder and making use of that space for a dust-protector of the special form shown, and combining the same with an oil-receiver to lodge the oil directly on the balls.

What I claim, and desire to secure by Letters Patent of the United States, is—

1. A dust-cap for a ball-bearing grooved on its inner edge and having a permanently-carried pad retained in said groove and adapted to have exclusively an edgewise bearing, and having also an extended flange on its inner edge for retaining the balls; in combination with the balls, the ball-holder, and the cone having a single straight cylindrical portion extending to its outer edge and bearing against the edge of the pad only substantially as and for the purpose described.

2. The combination of the ball-holder and balls, the cone dressed to a single straight cylindrical surface extending to the end of the cone, and a dust-cap having an annular portion fitted between the ball-holder and cylindrical portion of the cone and filling said space and having a groove opening on its inner edge at right angles to the cylindrical part of the cone and provided with a pad located permanently in said groove and bearing edgewise only against the cylindrical portion of the cone substantially as and for the purpose described.

3. The combination of the ball-holder and balls, the cone dressed to a cylindrical surface of less diameter than the ball-holder at its outer end so as to leave an annular space between, a dust-cap having an annular portion fitting between the ball-holder and cylindrical portion of the cone and filling said space and having a groove opening on its inner surface at right angles to the cylindrical portion of the cone provided with an edge-bearing pad and having also a convergently-inclined flange at its inner edge to retain the balls substantially as shown and described.

4. The combination of the ball-holder and balls, the cone dressed to a cylindrical surface of less diameter than the ball-holder at its outer end so as to leave an annular space between, a dust-cap having an annular portion filling this space and provided with an inwardly-convergent retaining-flange for the balls and an oil-tube communicating with the ball-holder inside this retaining-flange whereby the oil from said tube is made to flow over said flange and be directly delivered to the balls substantially as shown and described.

FREDERICK C. AVERY.

Witnesses:
A. J. McOscar,
Henry Fash.